United States Patent
Agrawal et al.

(10) Patent No.: US 9,047,298 B2
(45) Date of Patent: *Jun. 2, 2015

(54) FILE SEARCHING ON MOBILE DEVICES

(75) Inventors: Dakshi Agrawal, Monsey, NY (US);
Joel W. Branch, Hamden, CT (US);
Franck Le, White Plains, NY (US);
Sihyung Lee, White Plains, NY (US);
Mukesh K. Mohania, Agra (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/608,354

(22) Filed: Sep. 10, 2012

(65) Prior Publication Data
US 2013/0006974 A1 Jan. 3, 2013

Related U.S. Application Data

(63) Continuation of application No. 13/088,794, filed on Apr. 18, 2011.

(51) Int. Cl.
*G06F 7/00* (2006.01)
*G06F 17/30* (2006.01)

(52) U.S. Cl.
CPC .................. *G06F 17/301* (2013.01)

(58) Field of Classification Search
CPC ............... G06F 17/30979; G06F 17/30997; G06F 17/301
USPC ......... 707/705, 736, 741, 743, 746, 758, 769, 707/771, 780
See application file for complete search history.

(56) References Cited

U.S. PATENT DOCUMENTS

| | | | |
|---|---|---|---|
| 6,236,768 B1 | 5/2001 | Rhodes et al. | |
| 6,269,382 B1 * | 7/2001 | Cabrera et al. | 707/204 |
| 6,888,811 B2 * | 5/2005 | Eaton et al. | 370/338 |
| 6,969,382 B2 * | 11/2005 | Richter | 604/890.1 |
| 7,028,079 B2 * | 4/2006 | Mastrianni et al. | 709/217 |
| 7,578,441 B2 | 8/2009 | Gower et al. | |
| 8,131,725 B2 * | 3/2012 | Prahlad et al. | 707/739 |

(Continued)

FOREIGN PATENT DOCUMENTS

EP 0495622 A2 7/1992

OTHER PUBLICATIONS

Andre-Jonsson, H. et al., "Using Signature Files for Querying Time-Series Data", Principles of Data Mining and Knowledge Discovery, Lecture Notes in Computer Science, vol. 1263/1997, DOI: 10.1007/3-540-63223-9_120, pp. 211-220.

(Continued)

*Primary Examiner* — Marc Somers
(74) *Attorney, Agent, or Firm* — Tutunjian & Bitetto, P.C.; Preston J. Young

(57) ABSTRACT

Systems and methods are provided for file searching on mobile devices. A system includes a user interface and a file query system. The user interface is for receiving a user-provided spatio-temporal query for use in searching for a particular file. The user-provided spatio-temporal query is provided by a user of a mobile device. The file query system is for determining information about the particular file responsive to the user-provided spatio-temporal query, and identifying from the information one or more files as a search result for the particular file.

19 Claims, 8 Drawing Sheets

(56) References Cited

U.S. PATENT DOCUMENTS

| | | | |
|---|---|---|---|
| 2002/0069218 A1 | 6/2002 | Sull et al. | |
| 2005/0136988 A1* | 6/2005 | Villamil et al. | 455/567 |
| 2005/0222914 A1* | 10/2005 | Asher et al. | 705/26 |
| 2006/0136357 A1 | 6/2006 | Rasmussen et al. | |
| 2006/0179056 A1* | 8/2006 | Rosenberg | 707/6 |
| 2006/0242135 A1 | 10/2006 | Weare | |
| 2006/0256210 A1 | 11/2006 | Ryall et al. | |
| 2007/0127833 A1* | 6/2007 | Singh | 382/254 |
| 2007/0188626 A1* | 8/2007 | Squilla et al. | 348/222.1 |
| 2008/0091728 A1* | 4/2008 | Diederiks et al. | 707/104.1 |
| 2008/0235277 A1 | 9/2008 | Mathew et al. | |
| 2009/0089288 A1 | 4/2009 | Petersen | |
| 2009/0100046 A1 | 4/2009 | Huck | |
| 2009/0210495 A1 | 8/2009 | Wolfson et al. | |
| 2011/0173193 A1* | 7/2011 | Ahn et al. | 707/725 |
| 2011/0196888 A1* | 8/2011 | Hanson et al. | 707/769 |
| 2011/0302156 A1* | 12/2011 | Vadlamani et al. | 707/723 |

OTHER PUBLICATIONS

Brin, S. et al., "The Anatomy of a Large-Scale Hypertextual Web Search Engine", Seventh International World-Wide Web Conference, Apr. 1998, 20 pages.

Elsweiler, D., "Supporting Human Memory in Personal Information Management", ACM SIGIR Forum, vol. 42, Issue 1, Jun. 2008, pp. 75-76.

Faloutsos, C. et al., "FastMap: A Fast Algorithm for Indexing, Data-Mining and Visualization of Traditional and Multimedia Datasets", SIGMOD/PODS Joint ACM SIGMOD International Conference on Management of Data and ACM SIGACT-SIGMOD-SIGART, Symposium on Principles of Database Systems, May 1995, pp. 163-174.

Gyllstrom, K. et al., "Activity put in context: Identifying implicit task context within the user's document interaction", IIiX Proceedings of the second international symposium on Information interaction in context, Oct. 2008, pp. 51-56.

Gyllstrom, K. et al., "Confluence: Enhancing Contextual Desktop Search", SIGIR Proceedings Poster Confluence, Jul. 2007, pp. 717-718.

Mamoulis, N. et al., "Mining, Indexing, and Querying Historical Spatiotemporal Data", KDD Proceedings of the tenth ACM SIGKDD international conference on Knowledge discovery and data mining, Aug. 2004, pp. 236-245.

Okoli, A. et al., "Extraction of Contextual Metadata from File System Interactions", vol. 154 of Lecture Notes in Informatics, GI, Sep. 2009, pp. 1664-1671.

Soules, C. et al., "Connections: Using Context to Enhance File Search", Proceedings of the 20th ACM Symposium on Operating Systems Principles, Oct. 2005, pp. 119-132.

Xu, Z. et al., "Towards a Semantic-Aware File Store", In the Proceedings of HotOS-IX: The 9th Workshop on Hot Topics in Operating Systems, May 2003, pp. 145-150.

Patent Cooperation Treaty. "International Search Report and Written Opinion of the International Searching Authority" Issued for International Application No. PCT/US12/31962. Jun. 2012. (7 pages).

Non-Final Office Action issued on Sep. 2, 2014 in U.S. Appl. No. 13/088,794. (22 Pages).

* cited by examiner

FILE SEARCHING ON MOBILE DEVICES

CROSS-REFERENCE TO RELATED APPLICATIONS

This application is a Continuation application of co-pending U.S. patent application Ser. No. 13/088,794 filed on Apr. 18, 2011, incorporated herein by reference in its entirety.

BACKGROUND

1. Technical Field

The present invention generally relates to mobile devices and, more particularly, to file searching on mobile devices.

2. Description of the Related Art

The usage of ultra-light mobile computing devices (e.g., smart phones) will continue to increase at a rapid pace. Such devices have already become major conduits for the sharing of multimedia content (e.g., photos and video). As mobile devices become more acceptable and integral to workplace productivity, they will be used for creating, editing, and distributing traditional office documents.

These trends indicate that a fundamental user requirement will be an ability to search and retrieve documents in an intuitive manner on a mobile device. The main problem here is that mobile devices often lack a copy of the document itself. For example, some situations where the mobile device lacks a copy of the document including the following: the document may have been transferred to a laptop or other storage device and deleted from the mobile device; the document may have never been downloaded to the device such as, e.g., if the document is provided to the mobile device via an email and the user does not read/open the document or the attachment on the mobile device; the document may be transient and transcoded to fit the device form; and so forth. Current desktop search tools do not adequately address the problem at hand, as they primarily index files based on file names, contents, and document types which cannot work if the document itself is not available on the mobile device. In addition, the way these desktop search tools index files limits the kinds of queries a user can submit (by date of last modification, creation, filename, directories, words in the file, content type, and so forth). While such queries are useful in many circumstances, they are often frustrating to end-users as these existing tools exclude queries that use easy to remember spatio-temporal events associated with the documents.

Other related prior art proposes to associate files with other files that have been accessed around the same time or lower level system activities related to active application windows. These methods do improve traditional queries as they permit specifications of temporal events into the queries. However, these methods all require files to be present on the device to work and they fail to exploit unique features of the mobile devices that can help in document search.

SUMMARY

According to an aspect of the present principles, a system is provided. The system includes a user interface and a file query system. The user interface is for receiving a user-provided spatio-temporal query for use in searching for a particular file. The user-provided spatio-temporal query is provided by a user of a mobile device. The file query system is for determining information about the particular file responsive to the user-provided spatio-temporal query, and identifying from the information one or more files as a search result for the particular file.

According to another aspect of the present principles, a method is provided. The method includes receiving a user-provided spatio-temporal query for use in searching for a particular file. The user-provided spatio-temporal query is provided by a user of a mobile device. The method further includes determining information about the particular file responsive to the user-provided spatio-temporal query, and identifying from the information one or more files as a search result for the particular file.

According to yet another aspect of the present principles, a system is provided. The system includes a user interface and a file query system. The user interface is for receiving a user-provided spatio-temporal query for use in searching for a particular file. The user-provided spatio-temporal query is provided by a user of a mobile device. The file query system is for determining information about the particular file responsive to the user-provided spatio-temporal query, and identifying from the information one or more files as a search result for the particular file. The file query system determines the information about the particular file by comparing the user-provided spatio-temporal query to ambient environmental events and ambient device-related events with respect to the mobile device using a contextual radius. The contextual radius is associated with a given file operation and derived from the user-provided spatio-temporal query. The contextual radius defines at least one of a window of time and a geographic distance.

According to still yet another aspect of the present principles, a method is provided. The method includes receiving a user-provided spatio-temporal query for use in searching for a particular file. The user-provided spatio-temporal query is provided by a user of a mobile device. The method further includes determining information about the particular file responsive to the user-provided spatio-temporal query, and identifying from the information one or more files as a search result for the particular file. Determining the information about the particular file includes comparing the user-provided spatio-temporal query to ambient environmental events and ambient device-related events with respect to the mobile device using a contextual radius. The contextual radius is associated with a given file operation and derived from the user-provided spatio-temporal query. The contextual radius defines at least one of a window of time and a geographic distance.

According to a further aspect of the present principles, a computer readable storage medium including a computer readable program is provided. The computer readable program when executed on a computer causes the computer to perform the following. A user-provided spatio-temporal query is processed for use in searching for a particular file. The user-provided spatio-temporal query is provided by a user of a mobile device. Information about the particular file is determined responsive to the user-provided spatio-temporal query. One or more files are identified from the information as a search result for the particular file.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
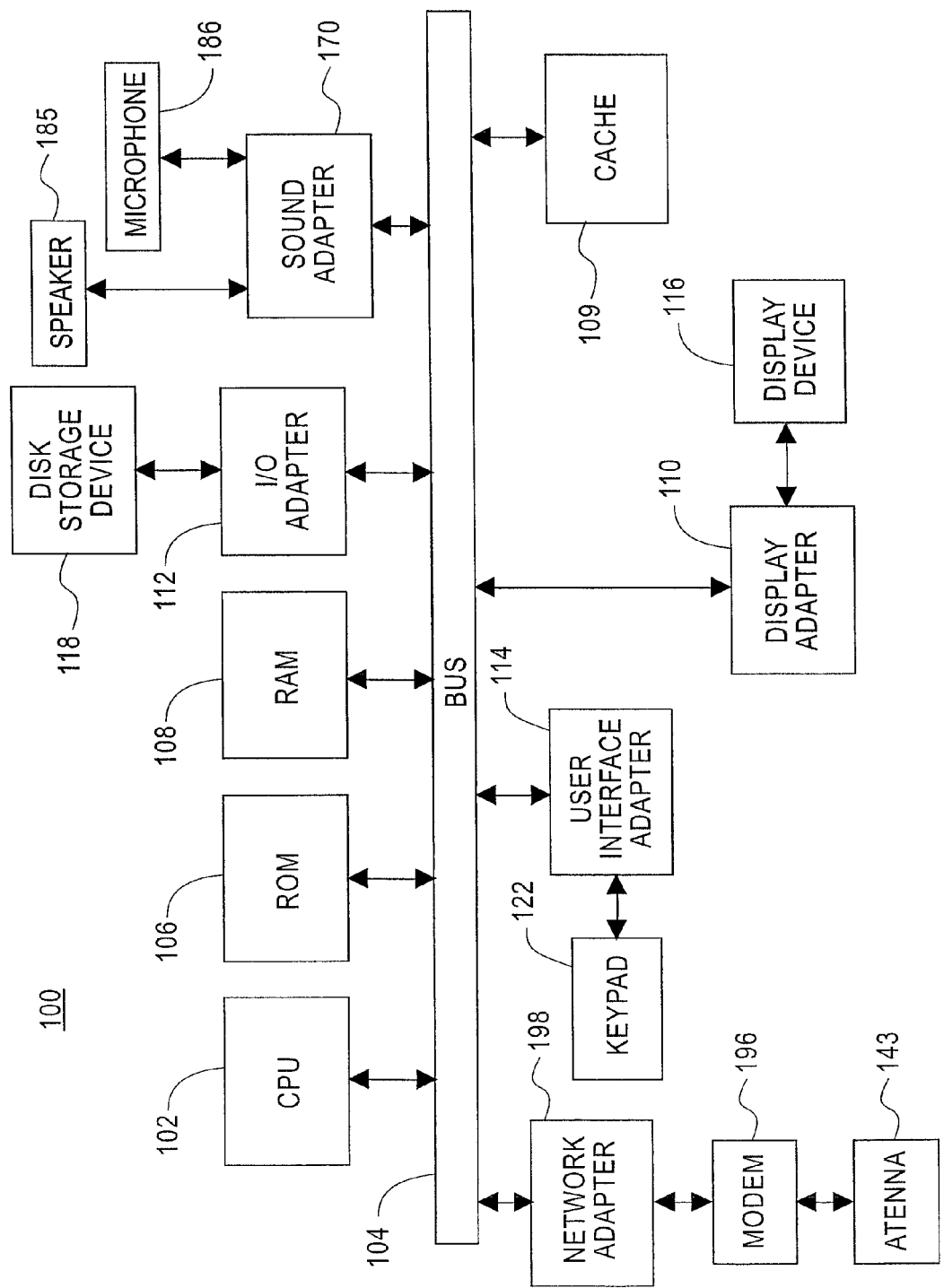
FIG. 1 shows a block diagram illustrating an exemplary mobile device 100 to which the present principles may be applied, according to an embodiment of the present principles.

As noted above, the present principles are directed to file searching on mobile devices. Advantageously, the present principles enable users to search for documents that they have received or otherwise have interacted with on a mobile device even when the document is not available at the device. In addition, the present principles advantageously enable users to issue queries that include spatio-temporal events associated with files that a user is likely to remember.

In one or more embodiments, we provide for file searching on mobile devices by indexing documents using geo-spatial and temporal events of significance that the user is likely to remember in addition to the traditional query indices. A geo-spatial event of significance may be, for example that "I briefly looked at that powerpoint at the San Francisco airport". A temporal event of significance may be, for example, that "Bill sent me that file right after our meeting at Corporate Headquarters/in Bill's office." Other examples are as follows: "I recall sending a version of that file to Beth for her comments"; and "Terry sent me the document right after our call ended discussing next action items." Of course, the preceding examples of geo-spatial and temporal events of significance are merely illustrative and, thus, the present principles may be applied to other geo-spatial and temporal events of significance as readily contemplated by one of ordinary skill in the art, while maintaining the spirit of the present principles.

Thus, in our approach, we consider a mobile device as an activity hub with rich contextual information (e.g., enabled through GPS, calendar, email, chat, traditional phone call logs, and so forth) that can be exploited to create geo-spatial and temporal indices to narrow down the list of possible documents instead of relying on documents being available for indexing in the mobile device. Once a list of possible documents is narrowed down, the documents can be fetched from a remote server (e.g., email or file server, office desktop, shared repositories) where the mobile may have stored the documents before deleting the documents from the local storage.

Hence, in one or more embodiments, the present principles can be considered to include the following two components: (1) spatio-temporal file indexing; and (2) user interface for query input and document retrieval.

Spatio-temporal file indexing starts with defining a "radius" of context to be associated with a given file operation (e.g., editing, sending, saving, and so forth). Specifically, this radius defines a window of time and a geographic distance. The window of time surrounds and/or otherwise encompasses a file operation, outside of which contextual attributes are not associated with the file operation. The geographic distance is a geographic distance threshold beyond which contextual attributes are invalidated as well.

An example regarding the temporal dimension includes associating data from calendar entries with a file operation if the entries' start and finish times occur within a particular number of hours (e.g., 24 hours) of the operation. Thus, for the temporal dimension, in an embodiment, all file operations can be either directly timestamped or can be easily be associated with a timestamp (e.g., in the cases of emailing or uploading a file).

Regarding the spatial dimension, the growing majority of mobile devices include GPS capability that can be used in conjunction with other services to provide a semantic interpretation of a location. Other methods might include cell tower triangulation or acquired location data from local hotspot signals.

Thus, regarding the spatial dimension, all locations (e.g., addresses, intersections, businesses, and so forth) within a particular distance (e.g., a ¼ mile) of where a file operation occurred will be associated with the operation. Of course, the spatio-temporal radius must be in reference to some origin point.

Another example for file indexing includes using "ambient" temporal events, which include those which are not directly detectable by information on the user's mobile device. An example of using ambient temporal events includes associating major news events with a file operation. For instance, one or more embodiments of the present principles might associate a major thunderstorm or snowstorm with a particular file operation using any number of web services or simple Rich Site Summary (RSS) feeds. Such a scenario would seem quite useful as telecommuters would very likely to remember that they performed a piece of work during inclement weather at home. In order to filter the collection of ambient temporal events, user preferences may also be considered. For example, someone interested in sports can tell the system to associate file operations with major sporting events such as games played by their favorite teams, and so forth.

Regarding the process of actually indexing file operations, there exist many potential data-mining related methods in the literature that can be used. Thus, the present principles are advantageously not limited to any particular indexing file operation. The "strength" of an association between a contextual attribute and a file operation can also be derived using techniques in the prior art and the contextual radius described above. For instance, the greater the "distance" an attribute falls from the file operation, the weaker the association will be. This can be used for context-based file retrieval. The indices for the files can be stored in any remote entity or, for improved speed, the indices for the files can reside on the mobile device.

Next we describe the user interface for query input and document retrieval. This starts with a user providing spatio-temporal query descriptions to the system. The user can use a graphical user interface (GUI) to enter queries such as "edited a PPT file at the Yale Bookstore last February." It is quite possible to recognize the spatio-temporal information embedded in this phrase using natural language processing and other related techniques.

Other query options are possible. For example, a user could enter spatial and temporal query attributes in separate fields. Another option includes using passive query attributes. As an example of using passive query attributes, a user can simply search for file operations by manually providing a temporal attribute and electing to use his or her current location as the spatial attribute. After a query has been submitted, a set of possible results are returned to the user meeting the specifications of the query. At this time, especially since the result set may be too large to be useful, further search specifications can be entered to filter the results. An example includes providing a "strength" value, which filters the query results based on the relevance of the results (e.g., derived from the strength of association as described herein). Other examples include providing traditional query attributes, such as content descriptions (when possible) and file types (if not indicated earlier). This process continues until the user is satisfied with the result. Afterward, the files may be accessed remotely from the mobile device, or downloaded for other purposes.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 shows an exemplary mobile device 100 to which the present principles may be applied, according to an embodiment of the present principles. The mobile device 100 includes at least one processor (CPU) 102 operatively coupled to other components via a system bus 104. A read only memory (ROM) 106, a random access memory (RAM) 108, a cache 109, a display adapter 110, an I/O adapter 112, a user interface adapter 114, and a network adapter 198, are operatively coupled to the system bus 104.

A display device 116 is operatively coupled to system bus 104 by display adapter 110. A disk storage device (e.g., a magnetic or optical disk storage device) 118 is operatively coupled to system bus 104 by I/O adapter 112.

At least one speaker (herein after "speaker") 185 and a microphone 186 are operatively coupled to system bus 104 by sound adapter 170.

A keypad 122 is operatively coupled to system bus 104 by user interface adapter 114. The keypad 122 is used to input and output information to and from mobile device 100.

A (digital and/or analog, wired and/or wireless) modem 196 is operatively coupled to system bus 104 by network adapter 198. An antenna 143 is operatively coupled to modem 196.

Of course, the mobile device 100 may also include other elements (not shown), including, but not limited to, a sound adapter and corresponding speaker(s), and so forth, as readily contemplated by one of skill in the art.

Figure 2:
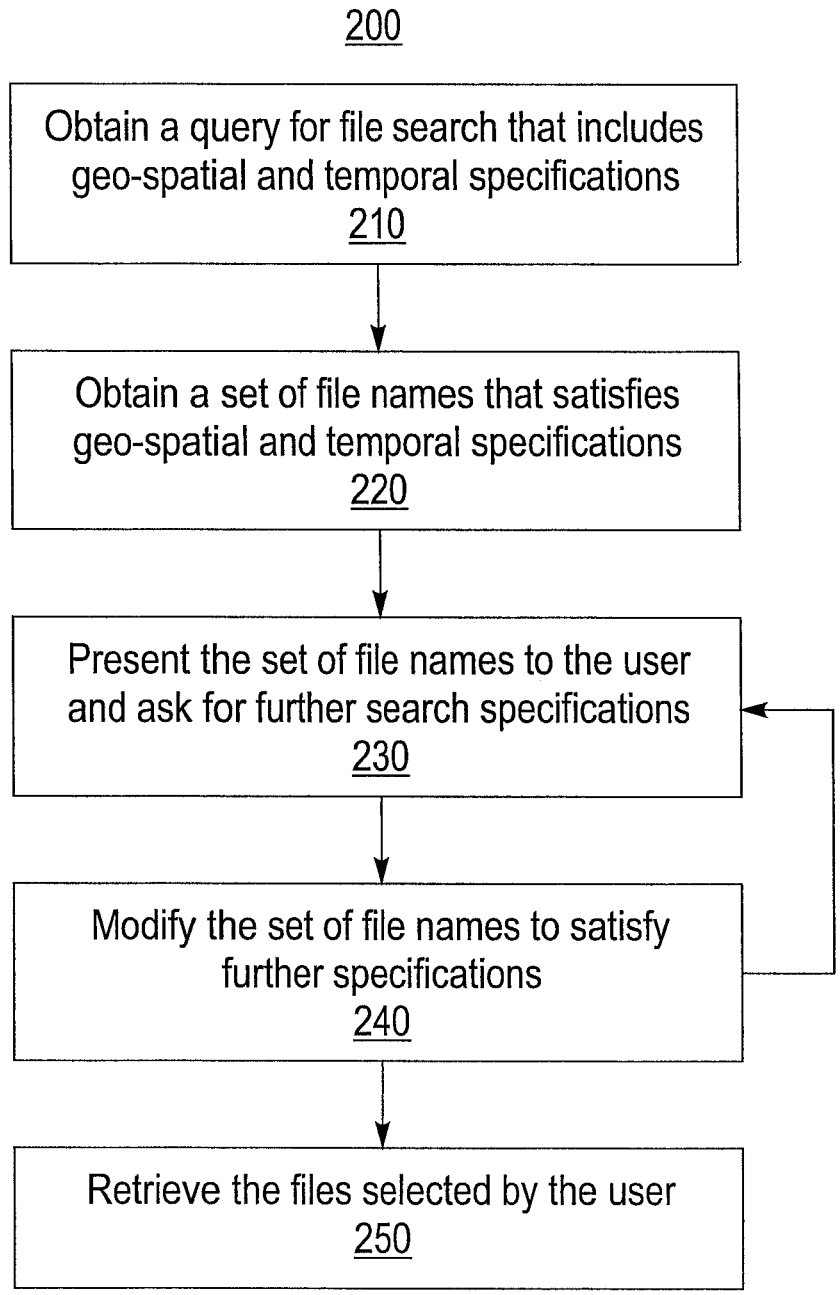
FIG. 2 shows a flow diagram illustrating an exemplary method 200 for file searching on a mobile device, according to an embodiment of the present principles.

FIG. 2 shows an exemplary method 200 for file searching on a mobile device, according to an embodiment of the present principles. At step 210, a query is obtained for file search that includes geo-spatial and temporal specifications. At step 220, a set of file names is obtained that satisfies the geo-spatial and temporal specifications. At step 230, the set of file names is presented to the user and the user is asked for further search specifications. At step 240, the set of file names is modified to satisfy the further search specifications if provided at step 230. At step 250, the files selected by the user are retrieved.

The term "file" refers to various types of content that may be stored in different formats. For example, a file can be a document, a presentation slide, an image, a song, a movie, a web page, and/or so forth.

The queries may include spatio-temporal queries. The term "spatio-temporal queries" may be defined as queries that indicate two elements: (i) a location associated with the sought after file; and (ii) a time associated with the sought after file. The user may specify one or both of these two elements. The user may also specify the approximate location and time (e.g., the file was read somewhere in New York City during the past week). These approximate location and time may be specified in the form of events (e.g., the file was modified 1-4 hours before the last month's meeting with the department head).

Figure 3:
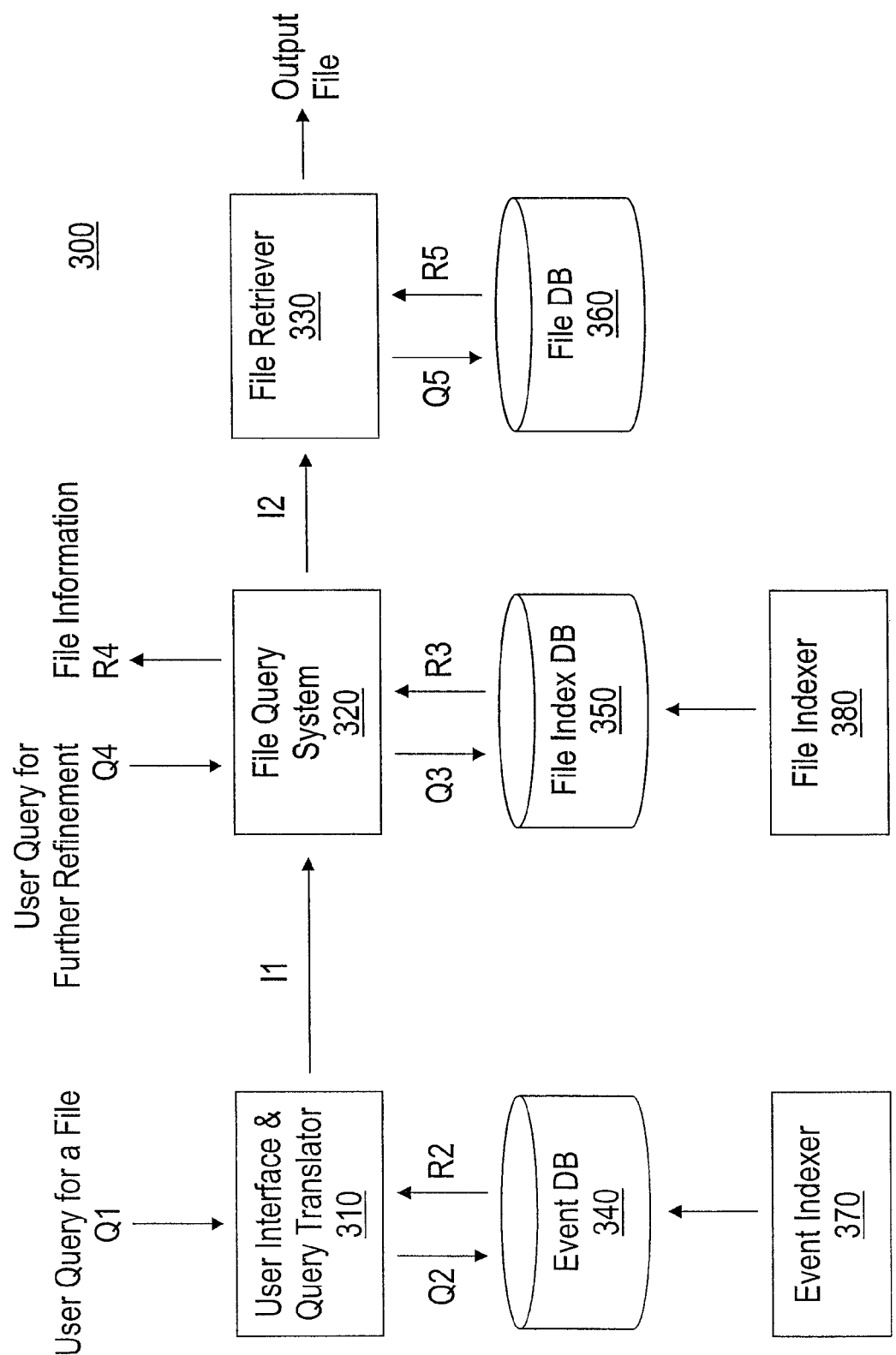
FIG. 3 shows a block diagram illustrating an exemplary system 300 for file searching on a mobile device, according to an embodiment of the present principles.

FIG. 3 shows an exemplary system 300 for filing searching in a mobile device, according to an embodiment of the present principles. The system 300 includes a user interface and query translator 310, a file query system 320, a file retriever 330, an event database (DB) 340, a file index database (DB) 350, a file database (DB) 360, an event indexer 370, and a file indexer 380.

The user interface and query translator 310 receives a user query for a file, the file query system 320 finds information about this file, and the file retriever 330 finally fetches the file. These components may resolve queries by retrieving information from the three databases, 340, 350, and 380. Databases 340 and 350 are populated by the two indexers, 360, and 370, respectively.

The user interface and query translator 310 has two primary functions. First, it allows the user to describe a spatio-temporal query for a file Q1. Second, it then translates this query into the consistent format I1, which may specify a range of location and time (e.g., within 1 mile from New York City and within 24 hours of midnight, Oct. 5, 2010).

The spatio-temporal query Q1 may be described in various formats. One possible format is a free form (e.g., I edited a PPT file at the Yale Bookstore last February), where the spatio-temporal information can be recognized using natural language processing. The form may also allow users to choose from a list of possible descriptors (e.g., "before/after" a time, "near" a location) and to do the logical AND and OR of multiple phrases. The form may also support the auto-completion of incomplete keywords and the correct of grammatical errors.

When the query Q1 includes an event, the user interface and query translator 310 resolves the query by referring to the event database 340. For example, a query for the event Q2 may be sent to the event database 340 (e.g., the last month's meeting with the department head), and this database may reply with the location and time of the event R2 (e.g., midnight, Oct. 5, 2010).

The event database may include various types of events. Some of these events may typically be found in mobile devices (e.g., calendar events, travel itineraries, phone/chat logs, and file/web access history). These events may be used to describe various activities (e.g., while listening to song A, the file was modified). Other events may not be directly found in mobile devices and thus may be collected from external servers. These events may include "ambient" events (e.g., major disaster and sporting events). The event indexer 370 may periodically collect these types of events and index the events. There exist a number of methods that can be used to index events by their names. Additional ambient events may be specified if mobile devices are equipped with various types of sensors. For example, thermometer recordings may allow the user to specify the query "it was cold when the file was accessed," and accelerometer/altimeter recordings may allow the user to specify the query The plane was descending to land when this file was accessed. Thus, as used herein, the phrase "event information" refers to any information capable of characterizing a particular event (including an ambient event or a non-ambient event). Thus, for example, such event information may include, but is not limited to, the time of event occurrence, the date of event occurrence, an event type, an event name, an event location, a game score, a sports team(s), a particular entertainer(s), a person in attendance, a route used to arrive at and/or depart from the event, an act (related or unrelated to the event) that was performed in preparation for the event and/or at the event and/or somehow related to the event, an item given to, raffled, or auctioned to event attendees, the weather (e.g., during the event), and so forth. Other examples of event information are also provided herein, again noting that the present principles are not limited to only the same and, thus, other items may be used for event information, while maintaining the spirit of the present principles. The query Q1 may also include a location by name (e.g., New York Public Library) and thus need to be translated into a consistent format (e.g., coordinates). This translation may be performed in the mobile device since a growing number of mobile devices include GPS capability. The translation may also be performed by accessing external location servers.

The specification of the query Q1 by range and events may allow the user to specify temporally (or spatially) related files. For example, the user works on file A after file B was modified but remembers only the file name of B. In order to locate file A, the user may then specify the query "the file was accessed after file B was accessed."

The file query system 320 finds the information about a set of files I2, given the range of location and time I1. This system sends a query for the file Q3 to the file index database 350, which then replies with the information about a set of files R3. This file set is then presented to the user (R4) through a user interface. This set R4 can be further narrowed down by using additional user queries Q4. These additional queries may include conventional file search criteria, such as file names, directories, and content type. According to the queries Q4, the system 320 modifies the file set R4 and present this set back to the user. The user may continue to refine the set R4 with multiple queries Q4 until the set is sufficiently small to identify the target file. Finally, the user selects files to retrieve, and their information I2 (e.g., indices to the selected files) is sent to the file retriever 330, which acquires the actual files from the File database 360.

The query Q3 may include the range of location and time. The response R3 may include a set of file names and the places where these files can be located. These places may refer to a directory in the mobile device. The places may also refer to an external storage where the file might be located, if the file was (i) deleted in the mobile device, (ii) transferred to another device, or (iii) attached in an email and not downloaded in the mobile device. For example, the response R3 may include a file name, an index to the email where this file was attached, and the server where this email was retrieved.

The file indexer 380 may periodically collect information about files and populate the file index database 350. This indexer may continue to trace the access to files by monitoring various types of events, such as reading a file, transferring a file, deleting a file, and reading an email where a file is attached. The indexer may then record the access history, which may include (i) the file name, (ii) the location where a file is accessed, (ii) the time when the file is accessed, and (iii) the place where the file is stored. There exist a number of methods that can be used to index information, such that spatio-temporal queries can be efficiently processed.

Figure 4:
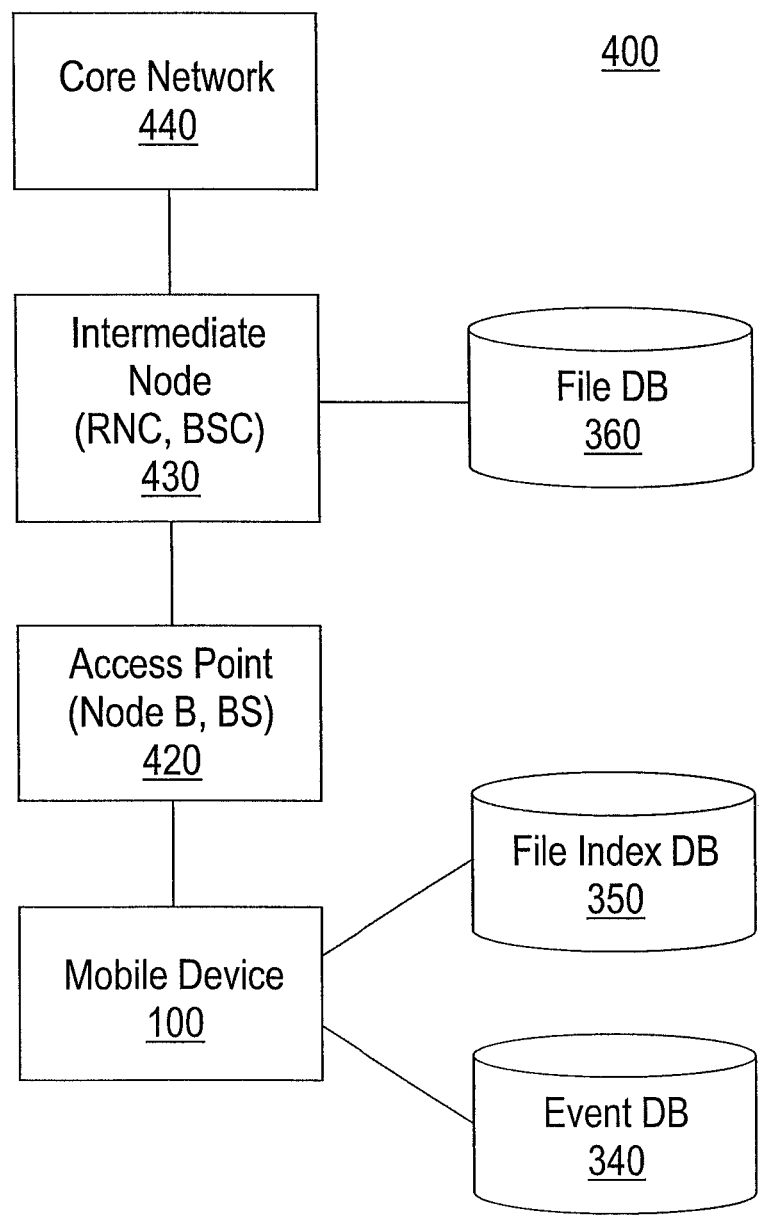
FIG. 4 shows a block diagram illustrating an exemplary wireless network 400 to which the present principles may be applied, according to an embodiment of the present principles.

FIG. 4 shows an exemplary wireless network 400 to which the present principles may be applied, according to an embodiment of the present principles. The network 400 which includes the following: mobile device 100, depicted here including an event database 340 and a file index database 350, access points 420 which may serve multiple mobile devices 100, intermediate nodes 430 which may serve multiple access points 420, the core networks 440 (e.g., core IP network) which may serve multiple intermediate nodes 430, and a file database 360.

The nodes 420 and 430 may have different names in different network standards. For example, in Universal Mobile Telecommunications System (UMTS) networks, the nodes 420 and 430 may be referred to as NodeB and Radio Network Controller (RNC), respectively. In Code Division Multiple Access 2000 (CDMA 2000) networks, the nodes 420 and 430 may be referred to as Base Station (BS) and Base Station Controller (BSC).

Here, the file database 360 is attached to the intermediate node 430. The database 350 may cache files that can potentially be accessed by the mobile devices 100 so that these files can be quickly fetched from downstream of the core network 440, rather than being fetched from further upstream of the core network 440. For example, the database 350 may prefetch files that are attached to emails. These emails are read by multiple mobile devices 100.

In other embodiments, the three databases, 340, 350, and 360 may be physically located at any node in the network 400. The entries in the databases may also be distributed in different nodes if one node may not be able to store all entries. For example, files that are more frequently accessed may be stored in the database 350 attached to an access point side of the network 400, whereas files that are less frequently accessed may be stored in the database 360 attached to a core network side of the network 400.

Figure 5:
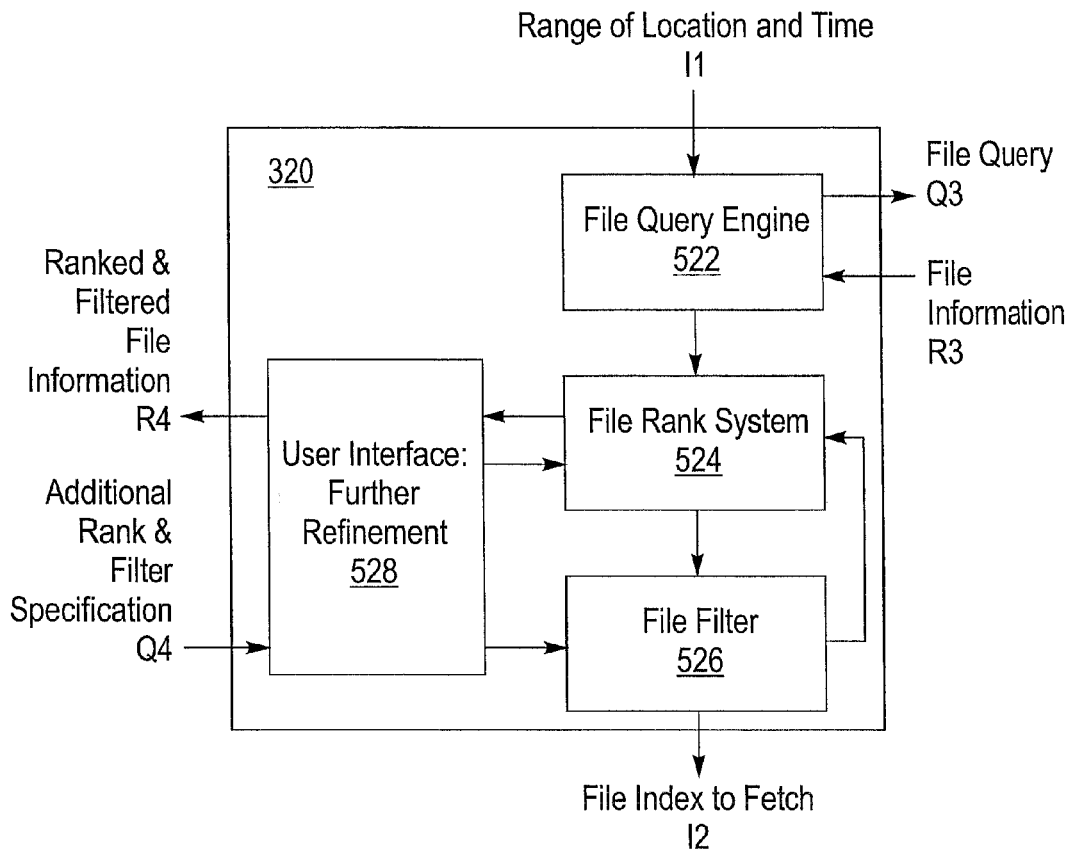
FIG. 5 shows a block diagram further illustrating the file query system 320 of FIG. 3, according to an embodiment of the present principles.

FIG. 5 further shows the file query system 320 of FIG. 3, according to an embodiment of the present principles. The file query system 320 (residing inside the mobile device 100) may include (i) a file query engine 522, (ii) a file rank system 524, (iii) a file filter 526, and (iv) a user interface 528. Given a spatio-temporal query from a user denoting a range of location and time I1, the file query engine 522 queries the file index database 30 with a range of location and time Q3, and then it retrieves the information in a set of file indices R3. The file rank system 524 may rank this set of files according to various criteria (e.g., more recently accessed files receive a higher rank), similarly to the way in which Internet search engines rank web pages. The file filter 526 may further narrow down the file set by allowing the user to specify additional queries through the user interface 528.

The file set R4 ranked by the file rank system 524 is first presented to the user through the user interface 528. The user can then choose to reduce the set R4 by specifying additional query Q4. This query Q4 may contain two components: (i) additional ranking criteria and (ii) additional filtering criteria. The ranking criteria may include "strength" scores (e.g., files receive a higher score if their access time and location are closer to the center of the specified range, as given in I1). The filtering criteria may include conventional file search criteria (e.g., file name, directories, words in the file, content type). The filtering criteria may also include a threshold of the strength scores (e.g., include only the files with scores greater than n, i.e., files that are accessed within a quarter mile of the specified location, as given in I1) and a threshold in the form of ranking (e.g., include only top 50 ranked files). According to the query Q4, the file filter 528 modifies the set R4, which is then re-ranked by the file rank system 524. The resulting set R4 is again presented to the user by the interface 528. The user may further narrow down the set R4 by specifying additional queries Q4. The user may also choose a subset of files to retrieve from R4, in which case, the indices to the selected files I2 are sent to the file retriever 330.

In the user interface 528, the additional query R4 may be described in various formats, similarly to the way the query Q1 is specified in the user interface 310. One possible format is the free form (e.g., give a higher rank for files that are more recently accessed), where the ranking and filtering information can be recognized using natural language processing. The form may also allow users to choose from a list of possible descriptions (e.g., "within n miles" from a location).

The user interface 528 (for additional query) may be integrated in one consistent interface with the user interface 310 (for initial query).

Figure 6:
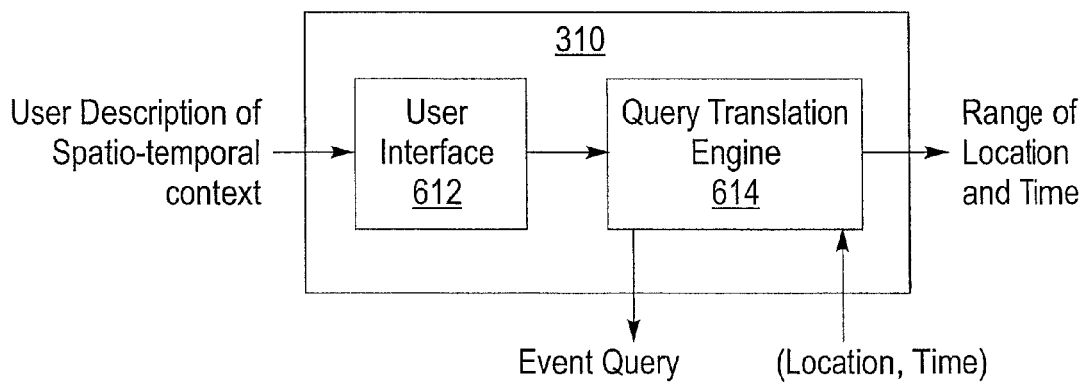
FIG. 6 shows a block diagram further illustrating the user interface 310 of FIG. 3, according to an embodiment of the present principles.

FIG. 6 further shows the user interface and query translator 310 of FIG. 3, according to an embodiment of the present principles. The user interface and query translator 310 includes a user interface 612 connected in signal communication with a query translation engine 614. The user interface 612 receives a user description of a spatio-temporal context. The query translation engine 614 receives the user description and provides a range of location and time as an output. The query translation engine 614 outputs an event query, for example, to the event database 340, and receives location and time information there from, or from another entity (e.g., the file index database 350.

We will not address one or more embodiments of the present principles implemented with respect to cloud computing. However, it is to be understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 7:
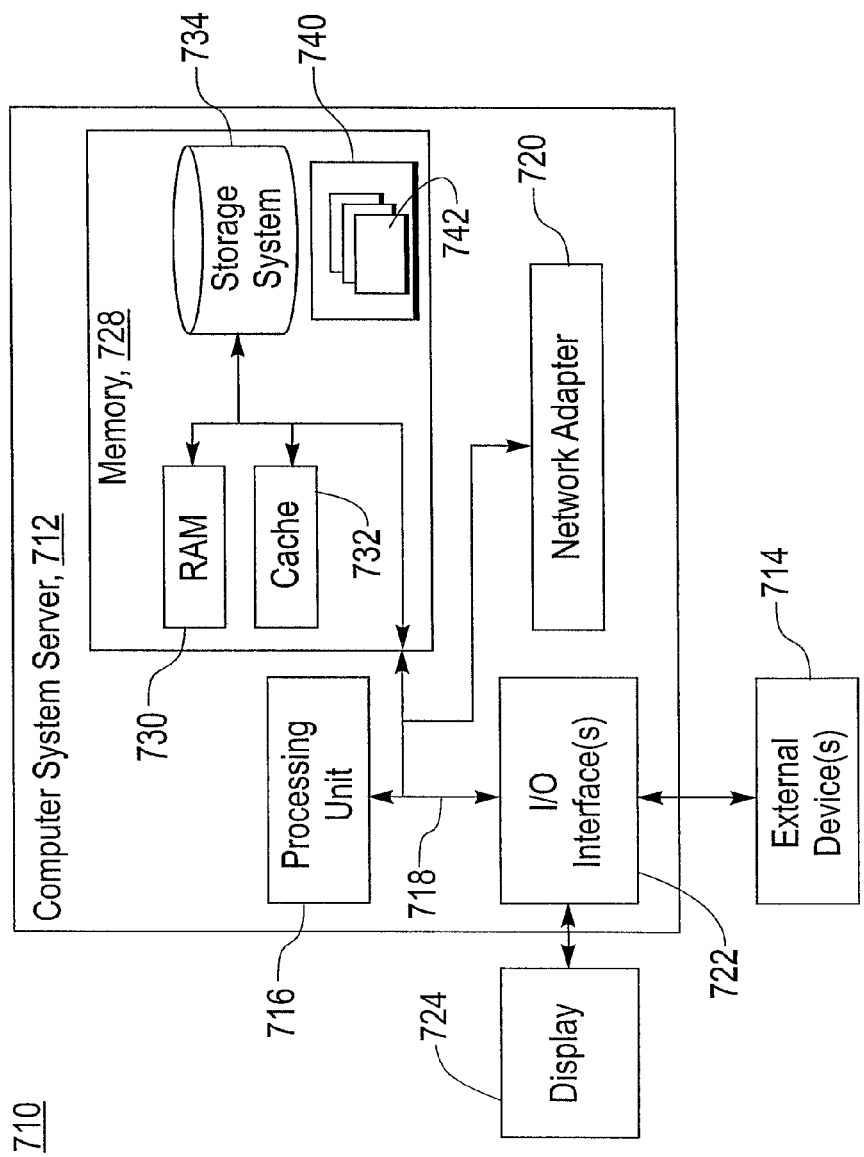
FIG. 7 shows a block diagram illustrating an exemplary cloud computing node 710, according to an embodiment of the present principles.

FIG. 7 shows an exemplary cloud computing node 710, according to an embodiment of the present principles. Cloud computing node 710 is only one example of a suitable cloud computing node and is not intended to suggest any limitation as to the scope of use or functionality of embodiments of the invention described herein. Regardless, cloud computing node 710 is capable of being implemented and/or performing any of the functionality set forth hereinabove.

In cloud computing node 710 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in cloud computing node 710 is shown in the form of a general-purpose computing device. The components of computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode; device drivers; redundant processing units; external disk drive arrays; RAID systems; tape drives; and data archival storage systems; and so forth.

Figure 8:
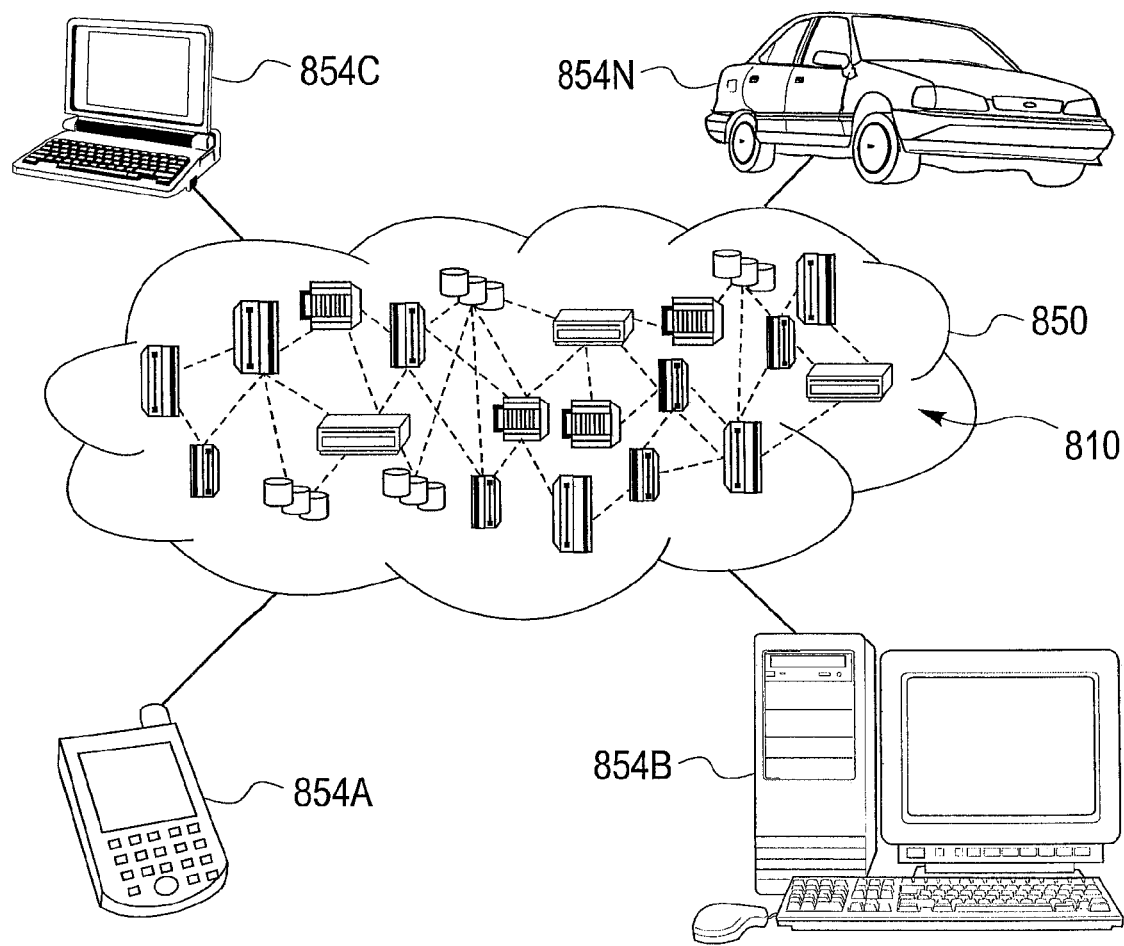
FIG. 8 shows a block diagram illustrating an exemplary cloud computing environment 850 to which the present principles may be applied, according to an embodiment of the present principles.

FIG. 8 shows an exemplary cloud computing environment 850 to which the present principles may be applied, according to an embodiment of the present principles. As shown, cloud computing environment 850 comprises one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
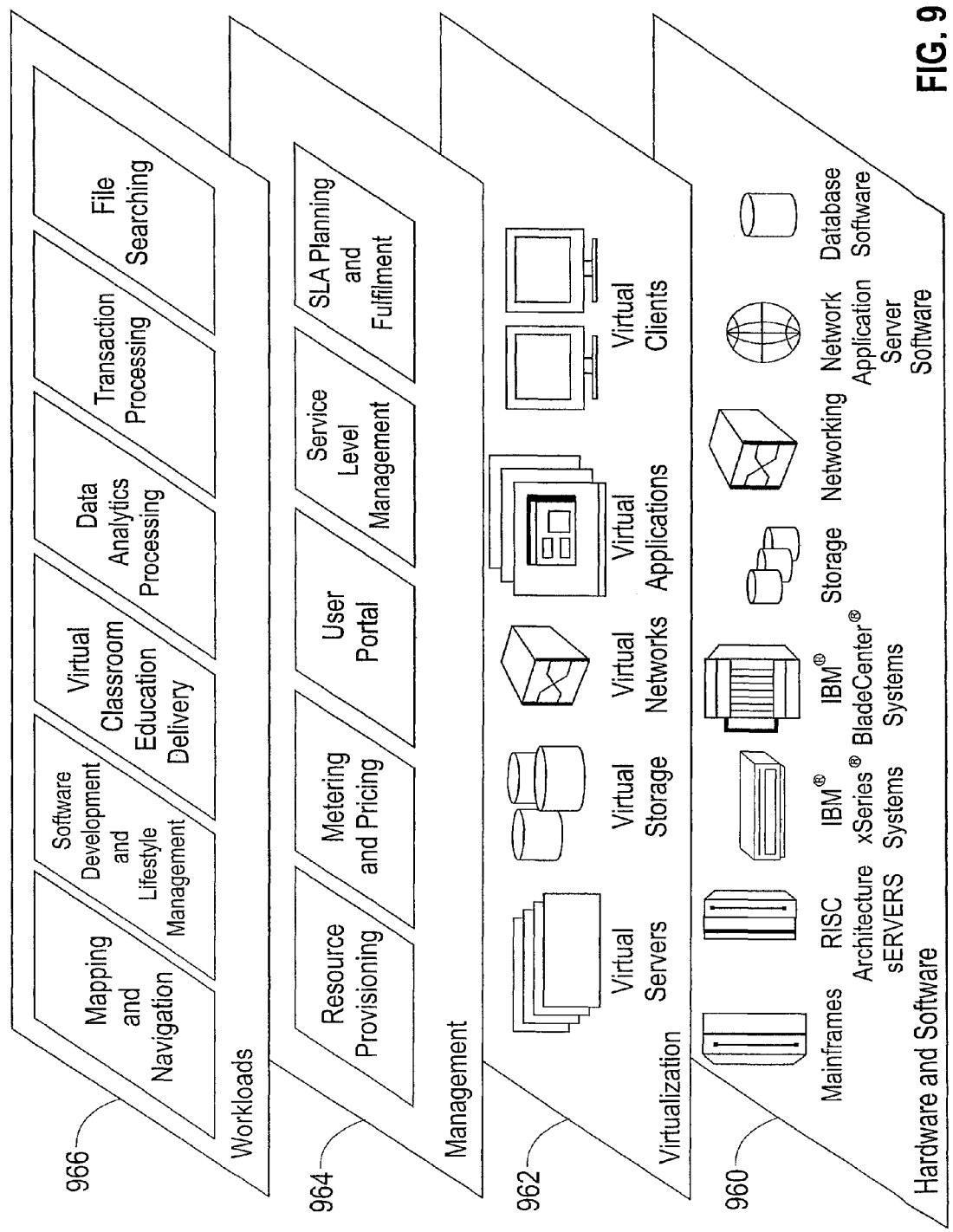
FIG. 9 shows a block diagram illustrating an exemplary set of functional abstraction layers provided by the cloud computing environment 850 of FIG. 8, according to an embodiment of the present principles.

FIG. 9 shows an exemplary set of functional abstraction layers provided by the cloud computing environment 850 of FIG. 8, according to an embodiment of the present principles. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 962 provides an abstraction layer from which the following examples of virtual entities may be provided: virtual servers; virtual storage; virtual networks, including virtual private networks; virtual applications and operating systems; and virtual clients.

In one example, management layer 964 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 966 provides examples of functionality for which the cloud computing environment may be utilized. Examples of workloads and functions which may be provided from this layer include: mapping and navigation; software development and lifecycle management; virtual classroom education delivery; data analytics processing; transaction processing; and file searching in mobile devices.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system, comprising:
   a user interface, having at least one hardware input device, for receiving a user-provided spatio-temporal query for use in searching for a particular file, the user-provided spatio-temporal query provided by a user of a mobile device; and
   a file query system for determining information about the particular file responsive to the user-provided spatio-temporal query, and identifying from the information one or more files as a search result for the particular file,
   wherein the user-provided spatio-temporal query specifies ambient device-related events, the ambient device-related events comprising one or more events detectable from data output from an accelerometer in the mobile device;
   wherein the information about the particular file comprises a location of the particular file, and the user-provided spatio-temporal query for finding the location of the particular file is in a form of the particular file was accessed after another file was accessed.

2. The system of claim 1, wherein the user-provided spatio-temporal query further specifies ambient environmental events.

3. The system of claim 2, wherein the ambient environmental events comprise one or more events where an item was raffled to event attendees.

4. The system of claim 2, wherein the ambient environmental events comprise a sports game, and the method further comprises storing event information about the sports game, wherein the event information is for use in determining the information about the particular file responsive to the user-provided spatio-temporal query, the event information comprising an act that was performed independent of the mobile device and in preparation for the sports game.

5. The system of claim 2, wherein the ambient environmental events comprise one or more events where an item was given to event attendees.

6. The system of claim 1, further comprising:
   an event database for storing event information about a plurality of events; and
   an event indexer for indexing the event information stored in the event database,
   wherein the event information is for use in determining the information about the particular file responsive to the user-provided spatio-temporal query, the event information comprising a time of event occurrence and a date of event occurrence for each of the plurality of events.

7. The system of claim 6, wherein the plurality of events comprise ambient events and non-ambient events relative to the mobile device, wherein the event information for the ambient events is obtained directly from the mobile device or from a remote source and the event information for the non-ambient events is obtained from the mobile device when pre-stored there or are otherwise obtained from the remote device.

8. The system of claim 1, further comprising:
   a file database for storing respective file specific information about each of a plurality of files;
   a file indexer for indexing the respective file specific information stored in the file database,
   wherein the respective file specific information is for use in determining the information about the particular file responsive to the user-provided spatio-temporal query, the respective file specific information for a given file from among the plurality of files comprising a name of the given file, a location from which the given file was previously accessed, a time when the given file was previously accessed, and a location where the given file is currently stored.

9. The system of claim 1, wherein the particular file is not resident on the mobile device at a time of receipt of the user-provided spatio-temporal query, and the one or more files includes at least one remotely located file with respect to a current location of the mobile device.

10. The system of claim 1, wherein the file query system is configured to maintain at least one file index that specifies the particular file, despite the particular file not being resident on the mobile device.

11. The system of claim 1, wherein a strength metric is calculated and used to identify the one or more files, the strength metric indicative of an amount of association between a contextual attribute and a file operation performed on the particular file based on a contextual radius, the contextual attribute and the file operation relating to the information about the particular file, the contextual radius specifying bounds on a context explicitly or implicitly present in the user-provided spatio-temporal query.

12. The system of claim 1, wherein the one or more events detectable from the data output from the accelerometer in the mobile device comprise a plane landing.

13. The system of claim 1, wherein the user-provided spatio-temporal query is received by a user-filled-out-form that supports Boolean operations on multiple user provided descriptors to formulate the user-provided spatio-temporal query.

14. The system of claim 1, further comprising populating a file index database by reading an email where the particular file is attached.

15. The system of claim 1, wherein the user-provided spatio-temporal query comprises an employment title of a particular person in attendance at a given one of the one or more events.

16. A non-transitory computer readable storage medium comprising a computer readable program, wherein the computer readable program when executed on a computer causes the computer to perform the following:
   processing a user-provided spatio-temporal query for use in searching for a particular file, the user-provided spatio-temporal query provided by a user of a mobile device; and
   determining information about the particular file responsive to the user-provided spatio-temporal query, and identifying from the information one or more files as a search result for the particular file,
   wherein the user-provided spatio-temporal query specifies ambient device-related events, the ambient device-related events comprising one or more events detectable from data output from an accelerometer in the mobile device;
   wherein the information about the particular file comprises a location of the particular file, and the user-provided spatio-temporal query for finding the location of the particular file is in a form of the particular file was accessed after another file was accessed.

17. The non-transitory computer readable storage medium of claim 16, wherein the one or more events detectable from the data output from the accelerometer in the mobile device comprise a plane landing.

18. The non-transitory computer readable storage medium of claim 16, wherein the ambient environmental events comprise one or more events where an item was raffled to event attendees.

19. The non-transitory computer readable storage medium of claim 16, wherein the ambient environmental events comprise a sports game, and the method further comprises storing event information about the sports game, wherein the event information is for use in determining the information about the particular file responsive to the user-provided spatio-temporal query, the event information comprising an act that was performed independent of the mobile device and in preparation for the sports game.

* * * * *